(12) United States Patent
Buchholz, Jr. et al.

(10) Patent No.: US 6,447,585 B1
(45) Date of Patent: Sep. 10, 2002

(54) CLOSED SYSTEM FOR VOLATILE ORGANIC COMPOUND RECYCLING

(76) Inventors: LeRoy H. Buchholz, Jr., 3941 NW. 67th Pl., Gainesville, FL (US) 32653; Loretta P. Buchholz, 3941 NW. 67th Pl., Gainesville, FL (US) 32653

( * ) Notice: Subject to any disclaimer, the term of this patent is extended or adjusted under 35 U.S.C. 154(b) by 0 days.

(21) Appl. No.: 09/481,036

(22) Filed: Jan. 11, 2000

(51) Int. Cl.$^7$ .............................................. B01D 47/06
(52) U.S. Cl. ...................... 96/234; 55/DIG. 46; 96/266; 96/270; 96/273; 118/61; 118/326; 210/748; 250/434; 250/435; 422/186.3
(58) Field of Search ......................... 95/225, 227, 228, 95/229, 149, 188, 189, 190, 194, 196, 197, 206, 209, 288; 55/DIG. 46; 118/58, 61, 326, DIG. 7; 96/224, 234, 240, 242, 236–239, 265, 266, 267, 270, 272, 273, 322; 210/748, 198.1; 250/432 R, 434, 435; 422/186.3

(56) References Cited

U.S. PATENT DOCUMENTS

| | | | |
|---|---|---|---|
| 963,529 A | * | 7/1910 | Dinghaus |
| 2,180,586 A | * | 11/1939 | Gustafsson ............ 55/DIG. 46 |
| 2,227,272 A | * | 12/1940 | Peters ................... 55/DIG. 46 |
| 2,227,465 A | * | 1/1941 | Roche, Jr. et al. ..... 55/DIG. 46 |
| 2,485,267 A | * | 10/1949 | Ellner |
| 3,672,823 A | * | 6/1972 | Boucher |
| 4,261,707 A | | 4/1981 | Bradshaw et al. |
| 4,265,642 A | * | 5/1981 | Mir et al. ............... 55/DIG. 46 |
| 4,444,573 A | | 4/1984 | Cosper et al. |
| 4,607,592 A | * | 8/1986 | Richter .................. 55/DIG. 46 |
| 4,620,858 A | | 11/1986 | Bradshaw et al. |
| 4,696,254 A | * | 9/1987 | Spindler ................ 55/DIG. 46 |
| 4,714,558 A | * | 12/1987 | Barbee et al. ......... 55/DIG. 46 |
| 4,783,257 A | * | 11/1988 | Morioka et al. ....... 55/DIG. 46 |
| 4,818,388 A | * | 4/1989 | Morioka et al. ....... 55/DIG. 46 |
| 4,927,437 A | | 5/1990 | Richerson |
| 5,019,138 A | * | 5/1991 | Farrah et al. .......... 55/DIG. 46 |
| 5,151,174 A | * | 9/1992 | Wiesmann |
| 5,165,969 A | * | 11/1992 | Barlett et al. ......... 55/DIG. 46 |
| 5,208,461 A | * | 5/1993 | Tipton |
| 5,460,702 A | * | 10/1995 | Birkbeck et al. |
| 5,618,333 A | * | 4/1997 | Buchholz, Jr. et al. 55/DIG. 46 |
| 5,728,185 A | * | 3/1998 | Buchholz, Jr. et al. 55/DIG. 46 |
| 5,780,860 A | * | 7/1998 | Gadgil et al. |
| 5,798,047 A | * | 8/1998 | Tekawa |
| 6,193,938 B1 | * | 2/2001 | Wedekamp |

FOREIGN PATENT DOCUMENTS

| | | | | |
|---|---|---|---|---|
| JP | | 60-125223 | * 7/1985 | ............ 55/DIG. 46 |

* cited by examiner

Primary Examiner—Duane S. Smith
(74) Attorney, Agent, or Firm—Saliwanchik, Lloyd & Saliwanchik

(57) ABSTRACT

In the method and system of the instant invention, volatile organic compounds (VOCs) liberated in the course of solvent-based painting of a workpiece, are recovered. The atmosphere within a closed spray-booth is maintained at a fixed humidity such that vaporized water, supplied in the form of steam or nebulized water vapor, acts as a carrier for VOCs liberated in the course of spray painting or heat curing of a workpiece. The VOCs may be recovered continuously, including during the spray-painting or heat curing of the workpiece. The VOC laden, humidified air is circulated through a condenser such that VOCs dissolved in the water vapor condense and are directed to a recovery means. The water and solvent are separated, recovered and purified for re-use or placed in an appropriate container for disposal, thereby eliminating the usual practice of expelling VOC laden air into the atmosphere. The system is provided with a flame-free heat source to cure the painted workpiece and to guard against the danger of explosion.

21 Claims, 5 Drawing Sheets

CLOSED SYSTEM FOR VOLATILE ORGANIC COMPOUND RECYCLING

BACKGROUND OF THE INVENTION

This invention concerns a method and system for recycling volatile organic compounds (VOCs) used in solvent-based paints. The system and method is applicable whenever a closed chamber or booth is used for spray-painting a workpiece, such as a car, to eliminate venting of VOCs to the atmosphere while capturing the VOCs for recycling.

Present day paint spray-booths need to be designed to provide a safe working environment, to prevent pollution of the atmosphere, and to enhance the quality of the product being sprayed. In general, paint spray-booths are equipped with a constant flow of air into and out of the spray-booth to maintain a reduced level of VOCs in the internal atmosphere. This arrangement has led to a number of attempts to reduce the level of VOCs in the exhaust air to minimize environmental pollution. One such attempt involves the use of aqueous-based, rather than solvent-based paints. Such efforts have generally produced inferior paint results and excessively long periods for drying of the workpiece. Limiting the amount of VOCs in solvent-based paints, as reported by at least one manufacturer, does help to reduce VOC emissions. However, substantial VOC emissions still occur when using such paints, and a more comprehensive solution is required.

Another attempt is found in U.S. Pat. No. 4,261,707, which discloses a complex process and system for elimination of paint solvent vapors from an automobile paint spray-booth and curing oven to maintain a healthful and clean environment for workers in the paint booth. The process and apparatus involves vacuum assisted vaporization of solvents from scrubber water for subsequent condensation and recovery of the solvent.

In U.S. Pat. No. 4,444,573, a method was disclosed for using a hydrotropic substance to decrease the level of an organic solvent in an air stream from a paint spray-booth. A hydrotrope is defined as a chemical substance which includes an organic group chemically bonded to a polar group. The function of the hydrotrope is to increase the solubility of a volatile solvent in water. The method involves (a) contacting of solvent laden air from a paint spray-booth with a spray of aqueous hydrotrope, (b) extracting solvent from the aqueous hydrotrope using an organic oil, and (c) stripping the solvent from the oil using a steam stripper followed by condensation and recovery of the solvent. In U.S. Pat. No. 4,620,858, related to the U.S. Pat. No. 4,261,707 patent discussed above, a method and system is disclosed which achieves contact between solvent from paint spray and an organic solvent absorbing liquid, followed by regeneration of the solvent absorbing liquid. This contact is achieved in a chamber separate from the chamber in which the spraying operation is conducted.

In U.S. Pat. No. 4,927,437, a method and apparatus for removing particles, including solvent droplets, from moving air in a paint spray-booth. The apparatus involves a cyclonic separator.

In the instant invention, a closed system is provided such that, in general, air is not vented to the atmosphere during paint spray operation. Rather, a worker in the closed system is provided with an independent source of air, such as grade D fresh air supplied respirators, thus complying with health and safety requirements of the Occupational Safety and Health Administration (OSHA). The use of a supplied air respirator is already mandated by OSHA (29 CFR 1910.134d1). The instant system involves direct condensation of VOCs from the humidified paint booth atmosphere and direct condensation of solvent laden water vapor, rather than vacuum assisted vaporization and subsequent condensation. A controlled temperature and humidity environment for optimal painting conditions is thereby provided while at the same time reducing environmental pollution.

BRIEF SUMMARY OF THE INVENTION

In the method and system of the instant invention, volatile organic compounds (VOCs) liberated in the course of solvent-based painting of a workpiece, are recovered. The atmosphere within a closed spray-booth is controlled at a fixed humidity such that vaporized water, supplied in the form of steam, acts as a carrier for VOCs liberated in the course of spray painting or heat curing of a workpiece. The VOCs may be recovered continuously, including during the spray-painting or heat curing of the workpiece. The VOC laden, humidified air is circulated through a condenser such that VOCs dissolved in the water vapor condense and are directed to a recovery means. The water and solvent are separated, recovered and purified for re-use or placed in an appropriate container for disposal, thereby eliminating the usual practice of expelling VOC laden air into the atmosphere. The system is provided with a flame-free heat source to cure the painted workpiece and to guard against the danger of explosion.

Thus, it will be appreciated by those skilled in the art that the instant disclosure has several objects. One object is to provide a paint spray-booth having a controlled temperature and humidity so that those working in the field will no longer be at the mercy of the elements when it comes to spray-painting a workpiece under optimal conditions of temperature and humidity.

Another object of this invention is to provide a closed system paint spray-booth which substantially reduces emissions of volatile organic compounds into the atmosphere.

Another object of this invention is to provide a paint spray-booth which will enable those working in the field to comply with local, state and federal clean air directives while at the same time providing an efficient, cost-effective and safe working environment for those working in the spray paint industry.

Other objects and advantages of this invention will become apparent from the full disclosure which follows.

DETAILED DESCRIPTION OF THE PREFERRED EMBODIMENT

This invention involves a closed system spray-booth which provides a thermostatically and humidistatically controlled environment for painting a workpiece and which recovers volatile organic solvents released into the air within the spray-booth during spray-painting and curing of a workpiece. The invention comprises a chamber within which a workpiece is spray-painted and cured, and at least one associated housing containing air treatment components. The chamber comprises:

(a) A sealable door through which a workpiece to be painted may be conveyed into and out of the chamber, a floor, a roof and walls;

(b) at least one sealable door through which a person who will spray-paint the workpiece may enter and leave the chamber;

(c) at least one source of supplied air for the person to use while present in the chamber;

(d) a means for circulating air within the closed system spray-booth such that the atmosphere within the booth is constantly recirculated between the chamber and the at least one housing containing air treatment components;

(e) a means for reducing or eliminating particulate matter from air as it passes from the chamber to the at least one housing containing air treatment components;

(f) a humidistat for measuring the level of humidity in the chamber at any given time, wherein the humidistat is operationally linked with a source of water vapor located in the at least one housing containing air treatment components such that when the humidity in the chamber falls below a pre-set limit, additional water vapor is added to the air entering the chamber.

The at least one housing containing air treatment components comprises:

(g) a water decontamination unit which comprises a condenser and a means for directing condensate to a means for neutralizing the condensed solvent;

(h) a source of water vapor for maintaining the interior of the chamber in a humidified state; and (i) a thermostat regulated flame-free heat source to cure the painted workpiece.

Air is constantly recirculated between the chamber and the at least one housing containing air treatment components which maintain the temperature and humidity of the air within the chamber within pre-set limits. The air treatment components constantly remove volatile organic compounds released into the air during spray-painting and subsequent curing of the painted workpiece. Only one housing containing all of the air treatment components (g), (h), and (i) need be provided while a second housing may provide all of these elements or only element (i) to ensure even heating of the workpiece.

Figure 1:
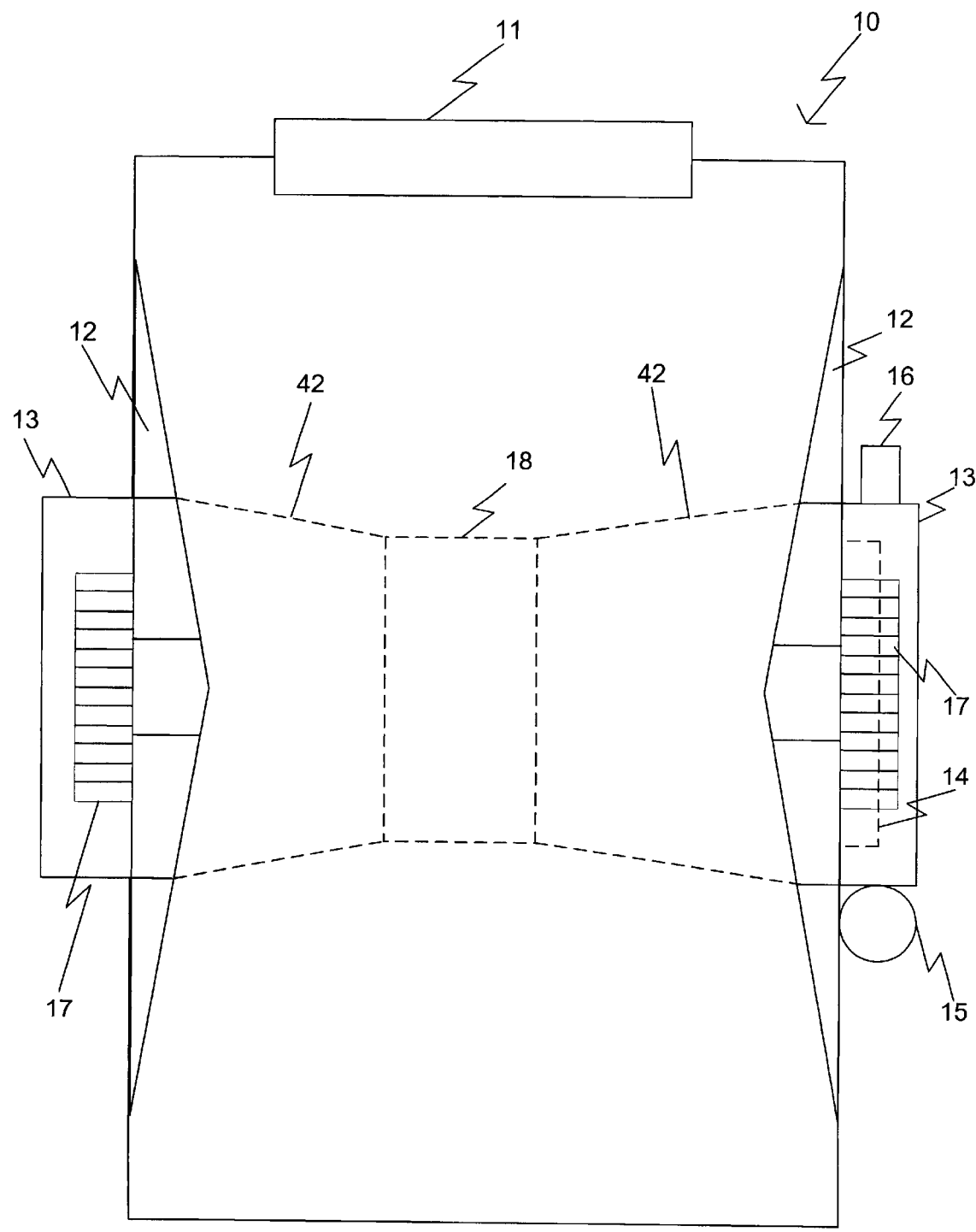
FIG. 1 is a top view of the paint spray-booth of this invention.

The operation of this system and its preferred embodiments may be best understood by referring now to FIG. 1. The paint spray-booth 10 of this invention is a sealed enclosure having four walls, a floor, a roof, at least one sealable door for a worker to enter and leave the booth, which may also be a double door with an interlock to minimize escape of internal air, and a sealable door 11 through which a workpiece to be painted is conveyed into the spray-booth. In operation, once the workpiece has been brought into the spray-booth 10, the door 11 is sealed and air re-circulation within the booth is begun as described further below. Because the system is closed and fresh air from the outside is not supplied during operation, a person working in the booth must be equipped with a supplied air breathing system. Manufacturers of such units exist such that a variety of different units are available. For example, Martech Services Company produces a number of different supplied air breathing systems which comply with OSHA requirements and which supply grade D air to either one or several different supplied air respirators at the same time. Those units are equipped with alarm lights and audible horns. In addition, in using any such system in the spray-booth of the instant invention, in a preferred embodiment, an interlock may be provided such that unless the worker is using an operational supplied air respirator, the interlock prevents operation of the spray equipment such that no VOCs can be released into the work space until an appropriate breathing apparatus is employed.

The internal air is recirculated by positive pressure and thereby induced to pass through a filter system 12 and into a housing 13 which contains air treatment components and which forms a duct system. Once a worker begins spray-painting the workpiece, such as a passenger vehicle, a piece of furniture or any other workpiece which requires a VOC solvated paint, spray particles in the air are trapped on the filters which comprise the filter system 12. According to an alternate embodiment, the particles may be removed from the air by a conventional air scrubber which forms a water and paint emulsion. This is less preferred because a large volume of contaminated water is thereby produced which also contains dissolved VOCs. Once the particulates are removed from the air, the solvent-laden air passing into the housing 13 experiences a different set of conditions depending on which side of the spray-booth is being considered. As shown in FIG. 1, there is a different set of components on the left side as opposed to the right side. This is a matter of choice and economy, and those skilled in the art will appreciate that the booth could operate with identical components on both sides of the booth.

Figure 3:
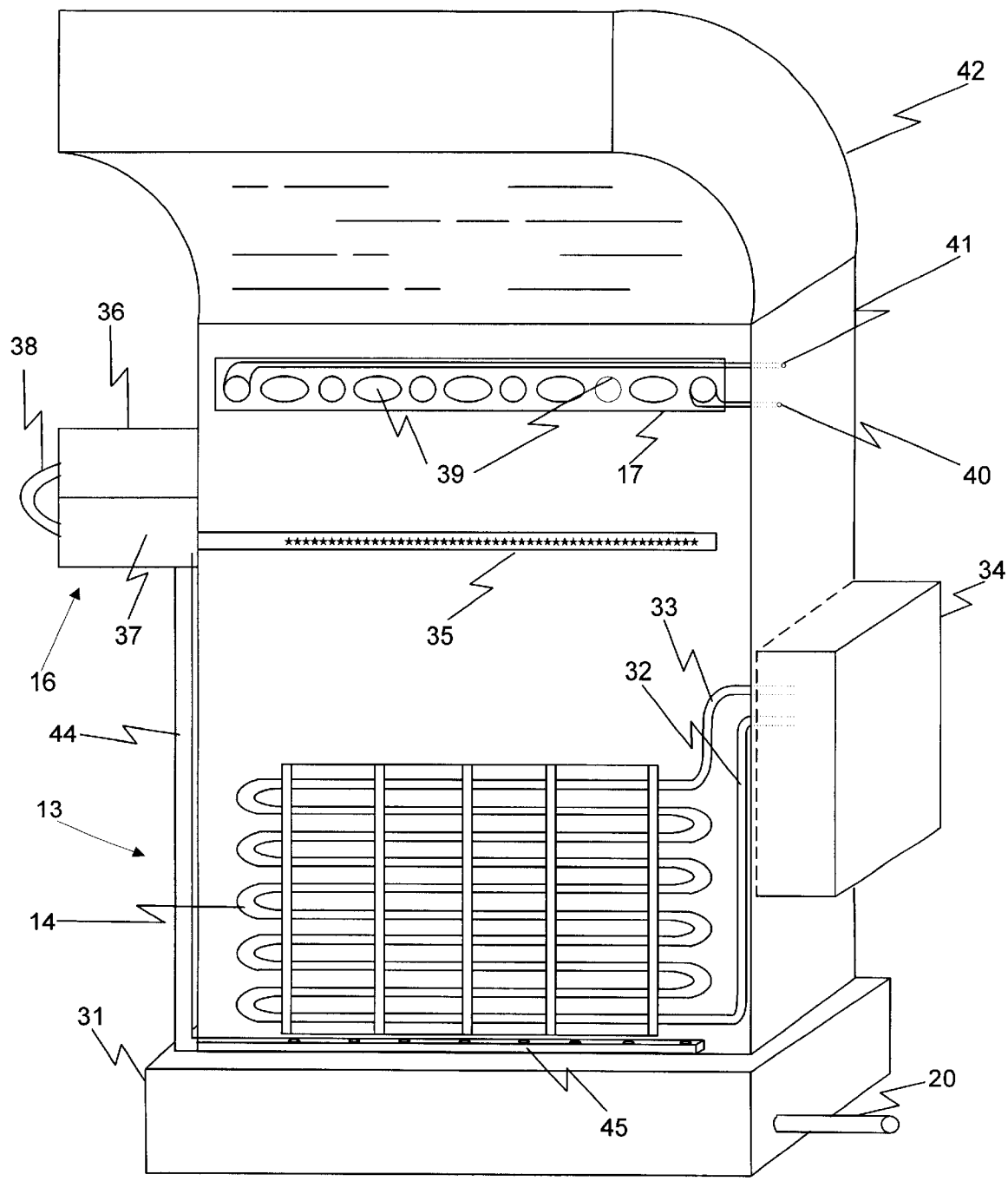
FIG. 3 is a schematic view of the housing containing air-treatment components as it would appear viewed through the wall of the paint spray-booth to which the housing is attached.
Figure 4:
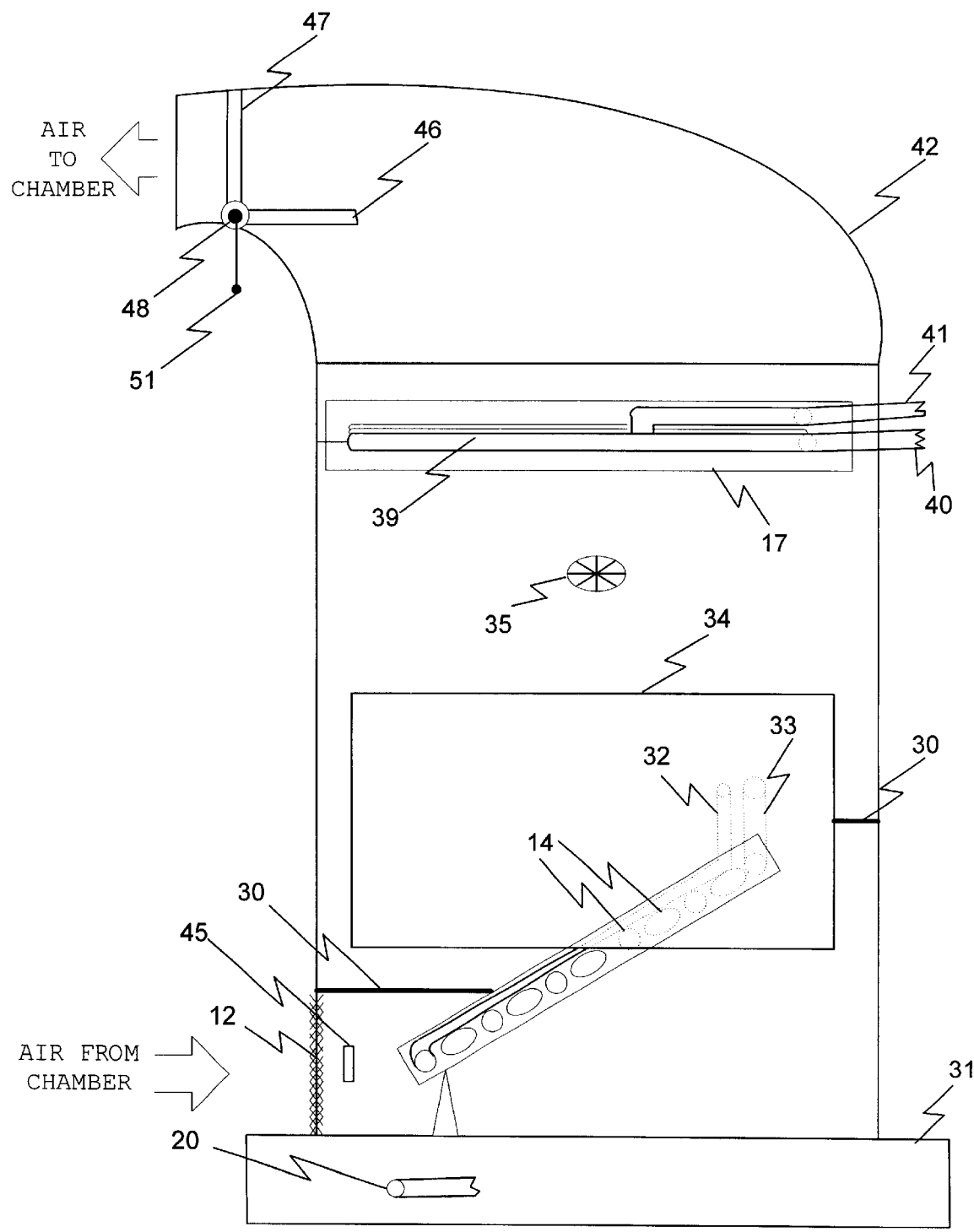
FIG. 4 is a side sectional view of the housing containing air-treatment components as it would appear viewed from the side of the paint spray-booth to which the housing is attached.

In the specific embodiment shown in FIGS. 1, 3 and 4, air passing through the filter system 12 on the right side of the booth. Upon exiting the filter system 12 the air flow is heated, via a steam generator 37, to 290° F. The steam is piped from the steam generator 37 through insulated piping 44 to the first steam wand 45. The 290° F. steam neutralizes many of the VOCs, transforming them into $CO_2$ and $H_2O$. The air flow then encounters condenser coils 14 which condense any humidity and VOCs dissolved in the water vapor as the air passes over the coils. The condensate drains from the condenser coils 14 to a water decontamination unit 15 which is described further below. The condensation coils 14 are part of a condenser unit which is conventional in the art of air-conditioning and therefore requires no further description here except to say that it is preferred that the coils be disposed at an angle so that as condensate collects on the coils, it runs down the coils and drips into a receptacle for conveyance to the storage and solvent recovery unit 15.

After dehumidification and removal of the VOCs entrained therein, the air is directed via the housing 13, which, as noted above, acts as a duct system for the air, into an area where a source of water vapor is added to the air by a humidistatically controlled water vapor generating device 16. Such devices are conventional in the art and need little further description here. Such devices as humidistatically controlled steam generators, sonic vapor generators or any like device which efficiently produces water vapor is acceptable. A commercially available humidistatically controlled steam generator is produced by AUTO-FLOW as a 1400 watt, 120 volt unit (model ESU-14) and as a 2000 watt, 220 volt unit (model ESU-20). Incorporation of such a device into the paint spray-booth of this invention is therefore contemplated. Preferably, the humidistat provides for precise control of the relative humidity within the booth. During the spray-paint operation, it is desirable to maintain a relative humidity in the range of about 45% to 55% relative humidity. This allows for optimal performance of the VOC based paints and provides sufficient humidity in the air to allow for efficient condensation and removal of dissolved VOCs. Those skilled in the art will appreciate that water additives may be included in the water, such as the hydrotropic substances described in U.S. Pat. No. 4,444,573, herein incorporated by reference for this purpose. During the drying cycle of the workpiece, when the temperature in the paint spray-booth is elevated to cure the paint (see further description below), it is desirable to maintain a relative humidity in the range of about 60% to 65%. Thus, it is desirable to equip the water vapor generating device 16 with a humidistat that may be easily set to maintain the humidity within either of these preferred operating relative humidity ranges. Control of the humidity and removal of the entrained VOCs has several additional advantages. Proper regulation of the humidity avoids dye-back, solvent popping and reduced lustre, which are all problems encountered in conventional paint spray-booths due to excessive humidity. In addition, proper regulation of the humidity increases the efficiency of the cure cycle such that less heat needs to be supplied. Thus, in a conventional paint spray-booth for automobiles, typically heat is supplied by a 1.5 million BTU direct fired gas furnace. In the instant invention, adequate heating may be achieved with a residential, oil-fired water heater (see further description below).

Once the air passes through the region in the housing 13 where water vapor is added, it is then forced into the a thermostatically controlled flame-free air-heating device 17. The device 17 may be any flame-free air heating device. However, since such devices were not readily commercially available, the instant disclosure provides for one such system which we installed for this purpose (see further description below). Air passing through the device 17 is heated to such an extent that the temperature within the paint spray-booth is maintained within desirable operating ranges both during the workpiece painting and curing cycles. During the painting cycle, the temperature is optimally maintained between about 60° F. and 90° F., more preferably between about 70° F. and 80° F. and most preferably at about 72° F. During the curing cycle, the temperature is maintained at about 115° F. to about 145° F., and most preferably at about 120° F. to about 130° F. It is desirable that there be an air-heating unit on both sides of the paint spray-booth to maintain even heating of the workpiece, particularly during the curing cycle. As noted above, only one condenser and one source of water vapor need be used on one or the other side of the booth, although these elements may also be provided on both sides.

Once the heated air leaves the flame-free air heating device 17, it is made to move into an air handling and fan assembly 18, mounted on top of the spray chamber, through a duct system 42. Additionally, to provide the least hostile environment to personnel working in the paint spray-booth 10, a carbon or charcoal filter 46 is mounted in the duct system 42. The filter 46 is to remove any remaining particulate matter from the air flow. The filter 46 is intended to be used only when personnel are working in the paint spray-booth 10, and to be rotated out of the air flow when personnel are not in the paint spray-booth 10. A rotation assembly 48 is mounted inside the duct system 42. An external handle 51 may be provided to rotate the assembly, or the assembly may be designed to automatically rotate by a control unit which triggers rotation upon certain monitored events. The filter 46 is mounted to the rotation assembly 48.

A baffle 47 is mounted perpendicular to the filter 46 on the rotation assembly 48, so that it is rotated into the air flow when the filter 47 is not in use. The baffle 47 maintains the same air flow rate as was present when the filter 46 was in the air flow. This assembly provides the source of positive pressure which causes the air trapped within the sealed paint spray-booth 10 to circulate through the filters and the other aforementioned components.

The air, as it reaches the assembly, is in a heated and humidified state, having been stripped of VOCs. It is drawn back into the paint spray-booth to once again pick up VOCs as they are released during either the paint spray operation or the curing of the painted workpiece. For the purpose of the air handling system, a device such as a squirrel-cage fan operating at between about 9,000 to about 12,000 rpm is adequate. The lowest possible air movement that achieves efficient removal of over spray and circulation of VOC laden water vapor is preferably used to optimize even paint application. In the instant system, only one fan for recirculating the air is needed, as an exhaust fan which drives VOC laden air into the atmosphere is not required. All that is needed is about a half of one pound of positive pressure to be produced to efficiently recirculate the air to achieve about 9,000 to about 12,000 cu.ft/min. circulation (the internal dimensions of a typical automotive paint spray-booth are 23 ft by 14 ft by 9 ft=2898 cu.ft.).

The above mentioned filter system 12 is preferably composed of a plurality of high-efficiency replaceable filter units. In one embodiment of this invention, the filter units are preferably comprised of an expanded polystyrene "prefilter" and a woven filter. The polystyrene pre-filter is used to trap the bulk of the paint particles as they are drawn into the filter system 12. The relatively particulate-free air is then drawn into the woven filter material to remove any residual particulates. This particular arrangement is preferred because the polystyrene material is relatively inexpensive and can be disposed as a small volume of hazardous waste upon "meltingdown" with a small volume of lacquer or other available solvent.

Figure 2:
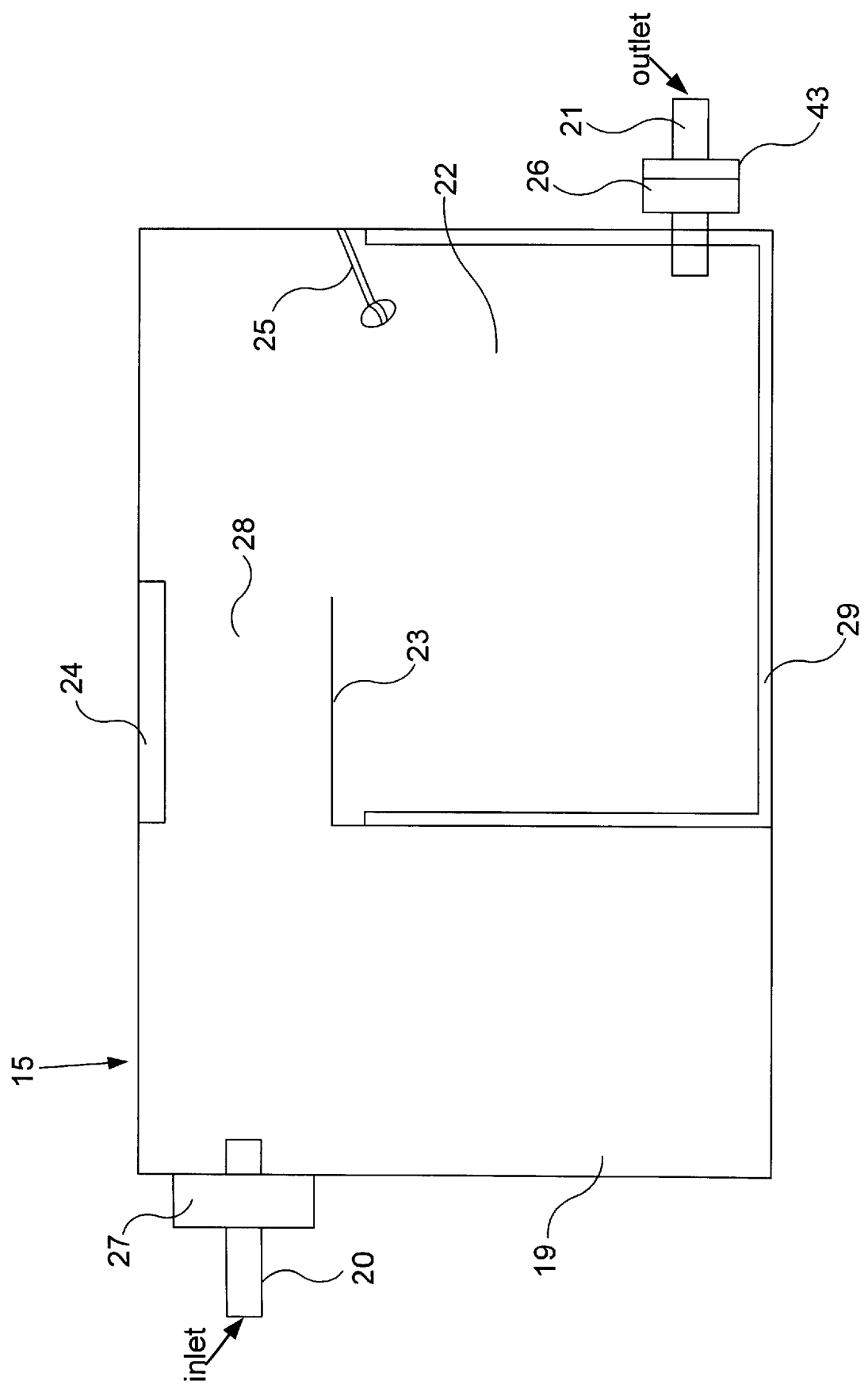
FIG. 2 is a schematic representation of the water decontamination unit of this invention.

The water decontamination unit 15 can be any sealed unit in which the various components of the condensate from the condenser 14 can be safely stored and the entrain solvent removed from the water. According to this embodiment of the invention, the water decontamination unit 15, is a self contained free standing unit which is shown in some detail in FIG. 2, comprised of a three chambered system. The condensate from the condenser 14 is pumped 27 into the liquid level controlled wastewater tank 19 (e.g., 5 gallon), via an inlet tube 20. While the wastewater tank 19 is filling with condensate the water and entrained solvent begin their natural process of separation, with the less dense solvent floating to the top. The water and entrained solvents remain in the wastewater tank 19 until the level rises to that of the UV chamber 28. The UV chamber 28 preferably comprises a flat aluminum surface 23 impregnated with an ultraviolet (UV) reflective material, such as titanium dioxide, and a UV light source 24 situated above the flat surface 23. The flat surface 23 and UV light source 24 span the width and length of the UV chamber 28. Once the level in the wastewater tank 19 reaches the UV chamber 28, the water and entrained solvents spill over into the UV chamber 28. The water and entrained solvents flow over the impregnated flat surface 23 and are simultaneously subjected to a continuous level of UV light from the UV light source 24. The UV light will tend to neutralize the entrained solvents in the water. Upon exiting the UV chamber 23 the treated water and any remaining solvents flow into the feed tank 22 (e.g., 15 gallons). The treated water will be stored in the feed tank 22 until it is reintroduced into the system.

In order to remove any remaining solvents present in the treated water, the feed tank 22 is lined with a disposable solvent absorbing urethane liner 29. The treated water will remain in the feed tank 22 until the water level rises sufficiently to activate an outlet pump 26, via a float activated switch 25, for example. Once activated, the outlet pump 26 transfers the treated water via an exit tube 21 through a disposable filter 43, preferably charcoal or carbon, to the upper fill compartment 36 for reintroduction into the system. The disposable filters 43 tend to remove any remaining particulate matter in treated water so as to maintain the operational integrity of the steam generators 37.

Figure 2A:
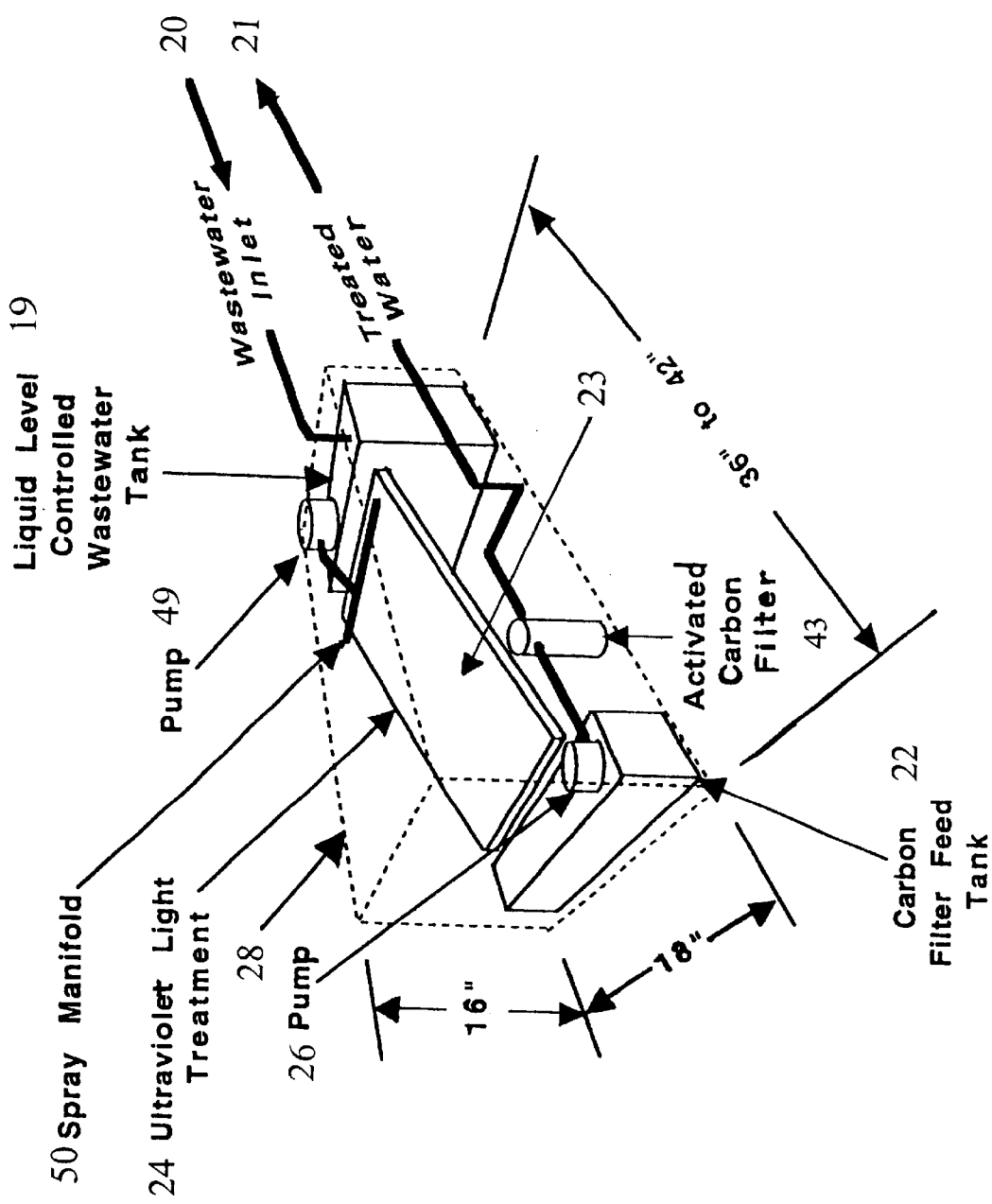
FIG. 2a is perspective view of an alternative representation of the water decontamination unit of this invention.

In an alternative embodiment, the water decontamination unit 15 in a self contained free standing unit is depicted in FIG. 2a. The water and entrained solvent are pumped from the condenser 14 into the wastewater tank 19. The water and entrained solvent will remain in the wastewater tank 19 until the waste and entrained solvent reach a sufficient level to activate the wastewater tank pump 49. The wastewater tank pump 49 transfers the water and entrained solvents from the wastewater tank 19 into the spray manifold 50. The spray manifold 50 uniformly distributes the water and entrained solvents over the flat aluminum surface 23, where they are treated with UV light, from the UV light source 24. The treated water flows into the carbon filter feed tank 22. The treated water will remain in the feed tank 22 until the water level rises sufficiently to activate the outlet pump 26. Once activated, the outlet pump 26 transfers the treated water via an exit tube 21 through a disposable filter 43, preferably charcoal or carbon, to the upper fill compartment 36 for reintroduction into the system. The disposable filters 43 tend to remove any remaining particulate matter in treated water so as to maintain the operational integrity of the steam generators 37.

The disposition of several of the above mentioned air-treatment components within the housing 13 is shown in greater detail in FIGS. 3 and 4. These figures show air entering the housing through the filter system 12. Upon exiting the filter system 12 the air flow is heated by the first steam wand 45 to 290° F. The air is forced to move upward through the condenser 14 by the suction created by the fan assembly 18 and the seal created by baffles 30. As moisture containing VOCs condenses on the condenser 14, it drips into the reservoir 31, from which is conducted via line 20 to the water decontamination unit 15. Lines 32 and 33, for conveying coolant to and from a compressor 34 are shown.

Once beyond the condenser 14, the air passes a source of water vapor 16 which distributes the water vapor into the moving air via a second steam wand 35 or like means. In one embodiment, the source of water vapor 16 is a steam generator having an upper fill compartment 36, which can receive water retrieved from the solvent recovery unit 15. The upper fill compartment 36 is connected to a lower, steam generator 37 via a hose 38. The steam generator 37 may, in addition, be equipped with a water line and a constant water level maintained by a float shutoff valve or electronically according to methods standard in the art. It will be appreciated by those skilled in the art that the steam generator may be, instead, a nebulizer or an ultrasonic generator for production and atomized water.

Once the air passes the water vapor generator 16, it passes through the flame-free air heating device 17, which may be comprised of a series of coils 39 through the inside of which heated liquid is passed from a remote liquid heating unit via inlet and exit pipes 40 and 41. Within the housing 13, as the recirculating air is passed through the heated coils, the humidified air becomes heated and enters the paint spray-booth as described above. In a particular embodiment of this invention, the liquid heating unit is a remote oil-powered 185,000 BTU water heater. Use of an oil fired unit is advantageous as it allows for better per day calculations of fuel use, although other fuel sources such as natural gas, propane or wood could be employed in an appropriately adapted boiler. To the circulating water, an appropriate concentration of polyethylene glycol or like material is added to elevate the boiling point and depress the freezing point of the water. The liquid is heated to about 238° F. and then conveyed through insulated 1.25 inch copper pipes to the coils internal to the flame-free heating device 17 and from there, back to the remote heating unit. Once the air has passed through the flame-free heater 17, it is conducted back into the sealed chamber through duct work 42 which connects the housing with the chamber, via the fan assembly 18.

The housing 13, and indeed the entire booth 10, may be insulated with about 1.5 inch thick high-density foam, with an R rating of about 18 to reduce heat loss and thereby decrease the cost of heating.

It will be appreciated from the foregoing description of this invention that a novel, sealed paint spray-booth has been provided which substantially reduces the level of VOCs emitted into the atmosphere as a result of the use of solvent-based spray paints. In addition, it will be appreciated that in a simple and cost effective fashion, a conventional paint spray-booth may be equipped with the various afore-described components so as to operate in an optimally thermostated and humidistated environment for optimal painting performance. Thus, both newly manufactured and retrofitted pre-manufactured or pre-fabricated paint booths comprising the elements herein described and claimed naturally come within the scope of this invention. While the invention has been described with respect to its preferred embodiments, and while specific details have been provided to enable those of ordinary skill in the art to comprehend the involved principles, it would be obvious to those skilled in the art from the foregoing disclosure that alternate embodiments may be operated in equivalent fashion to that described herein. Thus the invention is not to be construed as being limited to the disclosed specifics herein. The invention as herein described is only limited by the appended claims and equivalents thereof.

What is claimed is:

1. A closed system for volatile organic compound recycling, comprising a sealed spray-booth, at least one air recirculation housing, and a water decontamination unit, wherein air is continually recirculated within said spray booth through an air vent system attached to said air recirculation housing, and said air recirculation housing comprises a mean for removing particulate matter and volatile organic compounds (VOC) from said recirculated air, such that said VOCs are condensed into a contaminated water solution and transferred, through an inlet tube, into said water decontamination unit, wherein said water decontamination unit comprises a means for removing said VOCs from said contaminated water solution and a clean water solution is transferred, through an outlet tube, from said water decontamination unit to an upper fill compartment for reintroduction into said system, wherein said air recirculation housing comprises an air inlet and air outlet, wherein a contaminated air flow enters said air recirculation housing through said air inlet, and a clean air flow exists said air recirculation housing through said air outlet, said air recirculation housing comprises a means for inserting a filter into said air outlet, such that when a person is within said spray booth, said filter is inserted within said air flow, and when said person is not within said spray booth said filter is removed from said air flow.

2. A closed system for volatile organic compound recycling, comprising a sealed spray-booth, at least one air recirculation housing, and a water decontamination unit, wherein air is continually recirculated within said spray booth through an air vent system attached to said air recirculation housing, and said air recirculation housing comprises a mean for removing particulate matter and volatile organic compounds (VOC) from said recirculated air, such that said VOCs are condensed into a contaminated water solution and transferred, through an inlet tube, into said water decontamination unit, wherein said water decontamination unit comprises a means for removing said VOCs from said contaminated water solution and a clean water solution is transferred, through an outlet tube, from said water decontamination unit to an upper fill compartment for reintroduction into said system, said water decontamination unit comprising a waste water tank, an ultra violet (UV) light chamber, and a feed tank.

3. The water decontamination unit according to claim 2, wherein said waste water tank comprises a means for transferring said contaminated water solution into said UV chamber.

4. The waster water tank according to claim 3, wherein said means for transferring said contaminated water solution to said UV chamber comprises a float activated pump affixed to a spray manifold, wherein said spray manifold spans the width of said UV chamber.

5. The water decontamination unit according to claim 3, wherein said contaminated water solution entering said UV chamber flows over a substantially flat UV light reflective surface into said feed tank, and wherein said UV chamber further comprises a UV light source.

6. The UV chamber according to claim 5, wherein said substantially flat UV light reflective surface comprises an aluminum plate impregnated with a UV light reflective material.

7. The UV chamber according to claim 6, wherein said UV reflective material is titanium dioxide.

8. The water decontamination unit according to claim 5, wherein said feed tank is lined with solvent absorbing liner.

9. The water decontamination unit according to claim 5, wherein said feed tank contains filters.

10. The water decontamination unit according to claim 5, wherein an outlet pump transfers said clean water solution from said feed tank into said upper fill compartment.

11. The feed tank according to claim 10, wherein said outlet pump comprises a removable filter.

12. An air recirculation housing comprising an air inlet and air outlet, wherein a contaminated air flow enters said air recirculation housing through said air inlet, and a clean air flow exits said air recirculation housing through said air outlet, said air recirculation housing further comprising a means for inserting a filter into said air outlet, such that when a person is within said spray booth, said filter is inserted within said air flow, and when said person is not within said spray booth said filter is removed from said air flow.

13. A water decontamination unit comprising a waste water tank, an ultra violet (UV) light chamber, and a feed tank, wherein said UV light chamber comprises a UV light source and a substantially flat UV light reflecting surface, said substantially flat UV light reflecting surface being impregnated with a UV light reflecting material, such that a contaminated water solution from said waste water tank spills onto and flows over said substantially flat UV reflecting surface, while simultaneously being subjected to a substantially continuous level of UV light from said UV light source, the contaminated water exiting said UV light chamber into said feed tank.

14. The water decontamination unit according to claim 13, wherein said waste water tank comprises a means for transferring said contaminated water solution into said UV chamber.

15. The waster water tank according to claim 14, wherein said means for transferring said contaminated water solution to said UV chamber comprises a float activated pump affixed to a spray manifold, wherein said spray manifold spans the width of said UV chamber.

16. The UV chamber according to claim 13, wherein said substantially flat UV light reflective surface comprises an aluminum plate impregnated with said UV light reflective material.

17. The UV chamber according to claim 16, wherein said UV reflective material is titanium dioxide.

18. The water decontamination unit according to claim 13, wherein said feed tank is lined with a solvent absorbing liner.

19. The water decontamination unit according to claim 13, wherein said feed tank contains filters.

20. The water decontamination unit according to claim 13, wherein an outlet pump transfers said water solution from said feed tank into an upper fill compartment.

21. The feed tank according to claim 20, wherein said outlet pump comprises a removable filter.

\* \* \* \* \*